United States Patent
Choi

(10) Patent No.: US 8,251,308 B2
(45) Date of Patent: Aug. 28, 2012

(54) BOTTOM BLADE TYPE TREFOIL FLIGHT VEHICLE

(75) Inventor: Key Nam Choi, Seoul (KR)

(73) Assignee: Suntech Enterprises, Seoul (KR)

( * ) Notice: Subject to any disclaimer, the term of this patent is extended or adjusted under 35 U.S.C. 154(b) by 0 days.

(21) Appl. No.: 13/001,938

(22) PCT Filed: Jul. 1, 2009

(86) PCT No.: PCT/KR2009/003595
§ 371 (c)(1),
(2), (4) Date: Dec. 29, 2010

(87) PCT Pub. No.: WO2010/005202
PCT Pub. Date: Jan. 14, 2010

(65) Prior Publication Data
US 2011/0114785 A1    May 19, 2011

(30) Foreign Application Priority Data
Jul. 7, 2008    (KR) .................. 10-2008-0065298

(51) Int. Cl.
*B64C 27/06* (2006.01)
(52) U.S. Cl. ........ 244/23 C; 244/6; 244/12.4; 244/12.5; 244/17.11; 244/23 D
(58) Field of Classification Search ............. 244/6, 12.2, 244/12.4, 12.5, 17.11, 23 A, 23 C, 23 D, 244/23 R
See application file for complete search history.

(56) References Cited

U.S. PATENT DOCUMENTS
5,295,643 A    3/1994    Ebbert et al.
6,550,715 B1   4/2003    Reynolds FOREIGN PATENT DOCUMENTS
JP    2001026297 A    1/2001
JP    2001504773 A    4/2001
KR    20-2007-0000055 U    1/2007

OTHER PUBLICATIONS
International Search Report of International Application No. PCT/KR2009/003595, dated Feb. 12, 2010.

*Primary Examiner* — Tien Dinh
*Assistant Examiner* — Nicholas McFall
(74) *Attorney, Agent, or Firm* — Kile Park Goekjian Reed & McManus PLLC

(57) ABSTRACT

Conventional bottom blade type trefoil flight vehicles have composite structures wherein a plurality of pairs of fixing plates, forward/backward adjustment blades, and left and right rotation adjustment blades are separately mounted and adjusted, and thus have difficulties in scouting and surveillance in an indoor area due to the heavy weights and the large volumes of the flight vehicles. Another conventional flight vehicle has drawbacks in that flight in the left and right directions is difficult, and an adjustment blade and a fixing plate are arranged adjacent to each other to cause mutual influences of wind and non-uniformity in the flow of wind. The present invention provides a flight vehicle characterized in that three pairs of fixing plates with fixed pitch propellers and adjustment blades are installed at an angle of 120 degrees. The present invention allows anti-torque, hovering, forward/backward advancing, left and right rotation, and flight in the left and right direction of flight vehicles, and scouting and surveillance in a narrow space. The flight vehicle of the present invention is simple in structure and control, lightweight, and small in size, thereby improving power efficiency.

3 Claims, 7 Drawing Sheets

[Fig. 1]
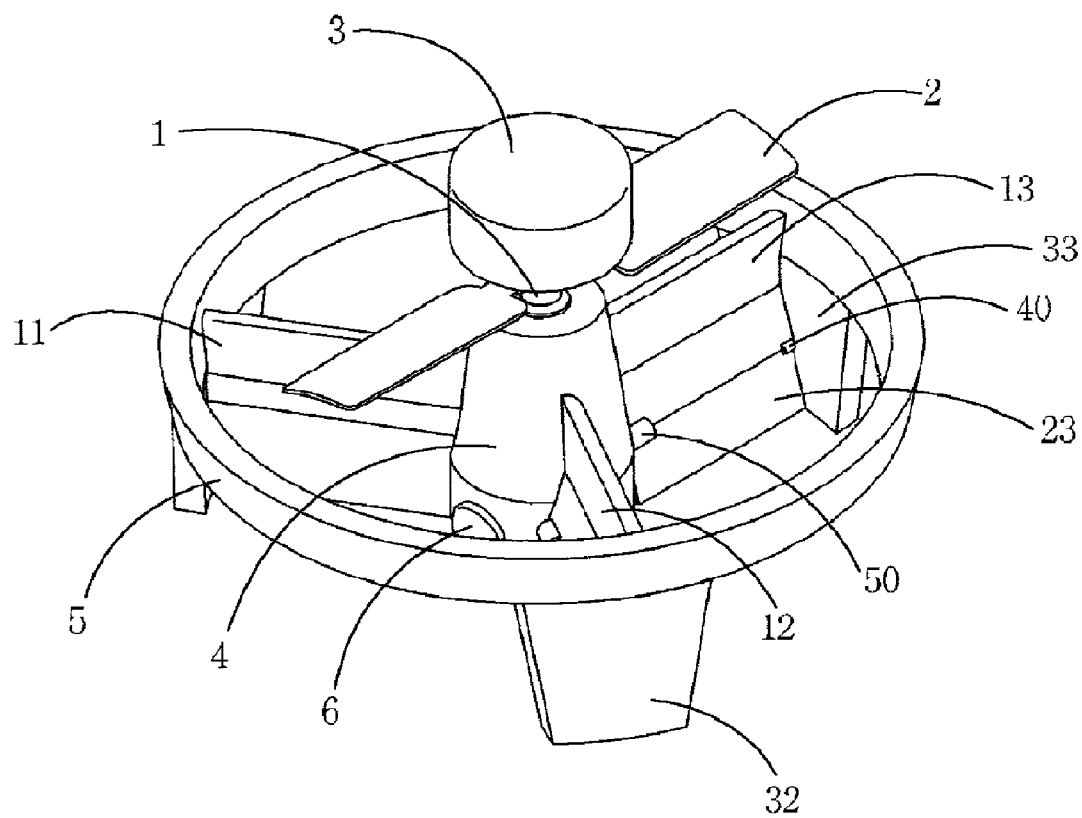

[Fig. 2]
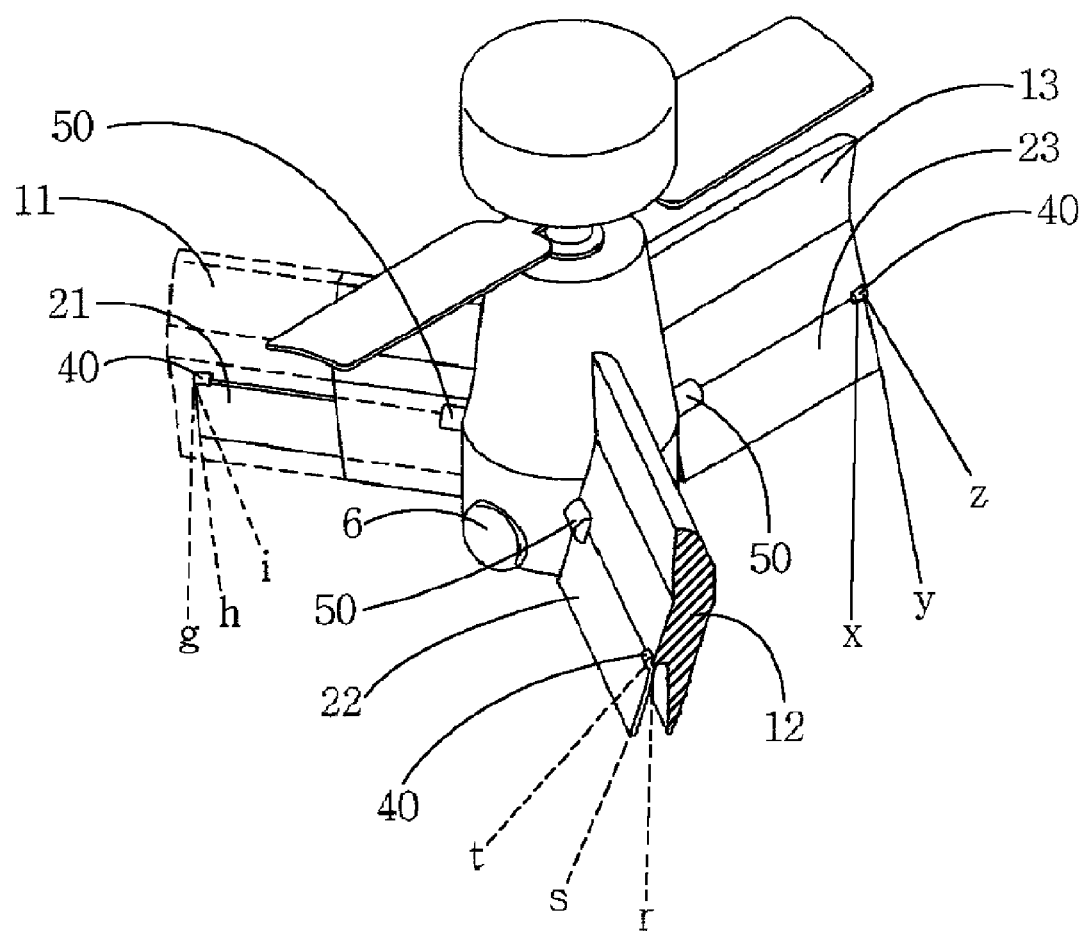

[Fig. 3]
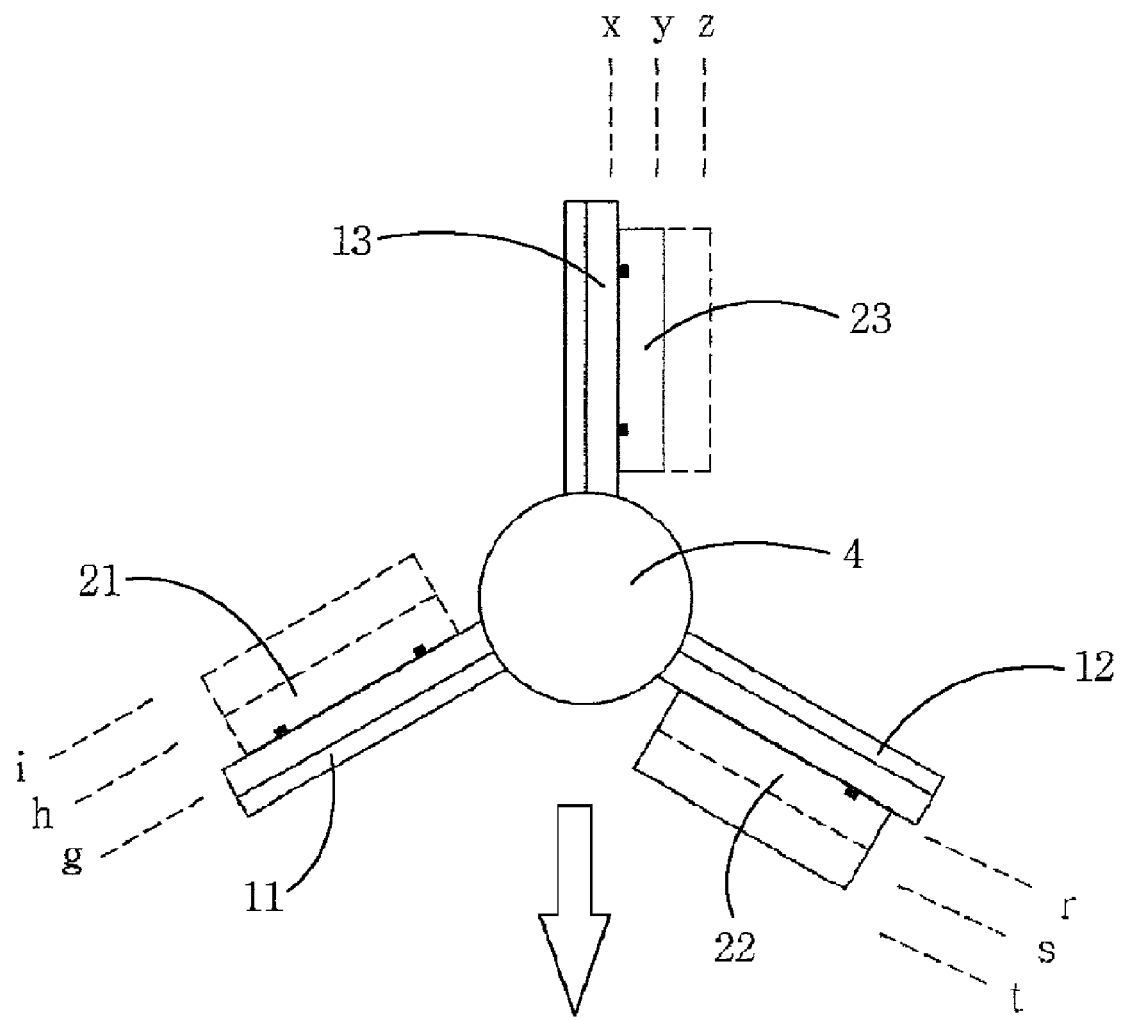

[Fig. 4]
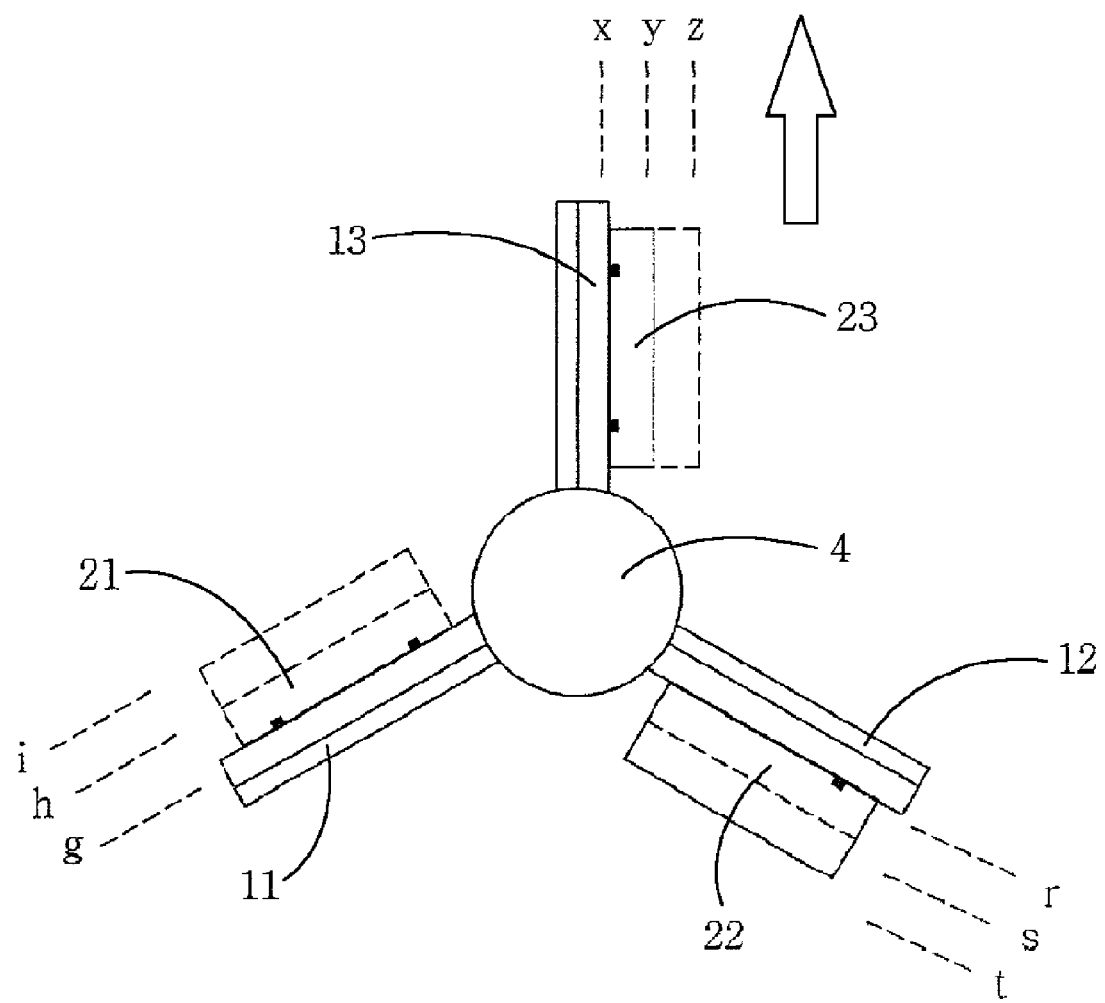

[Fig. 5]
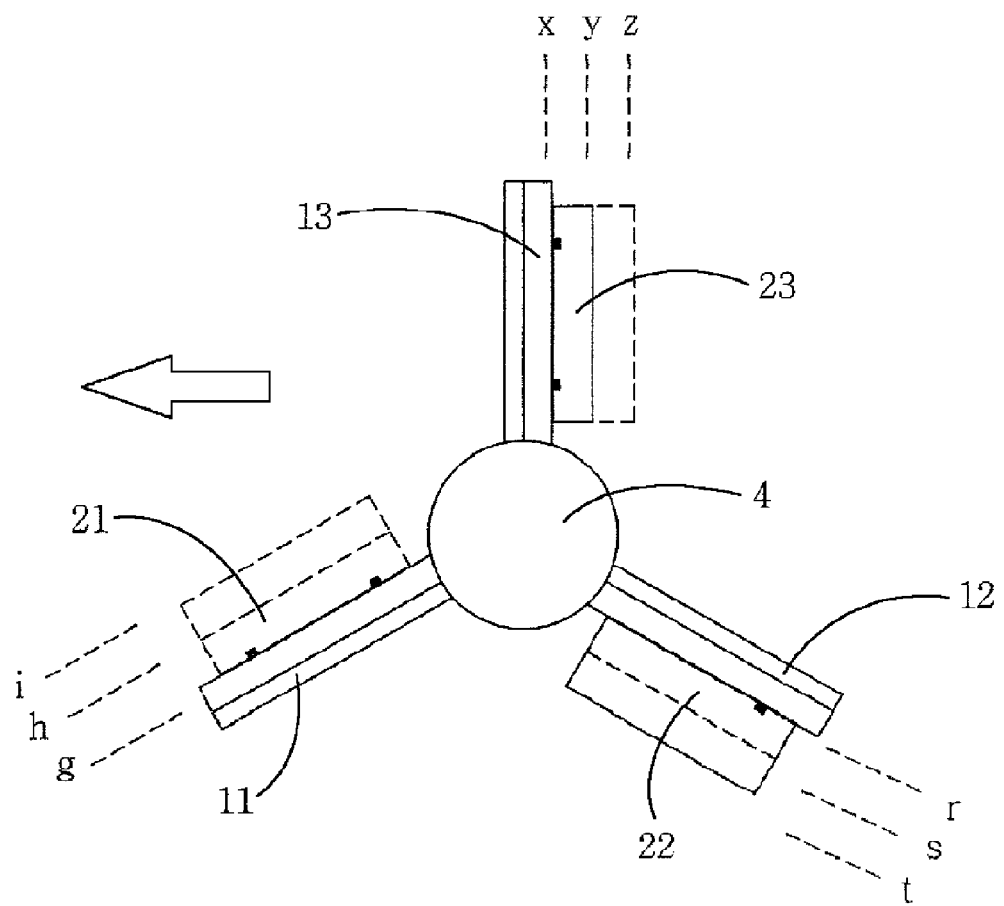

[Fig. 6]
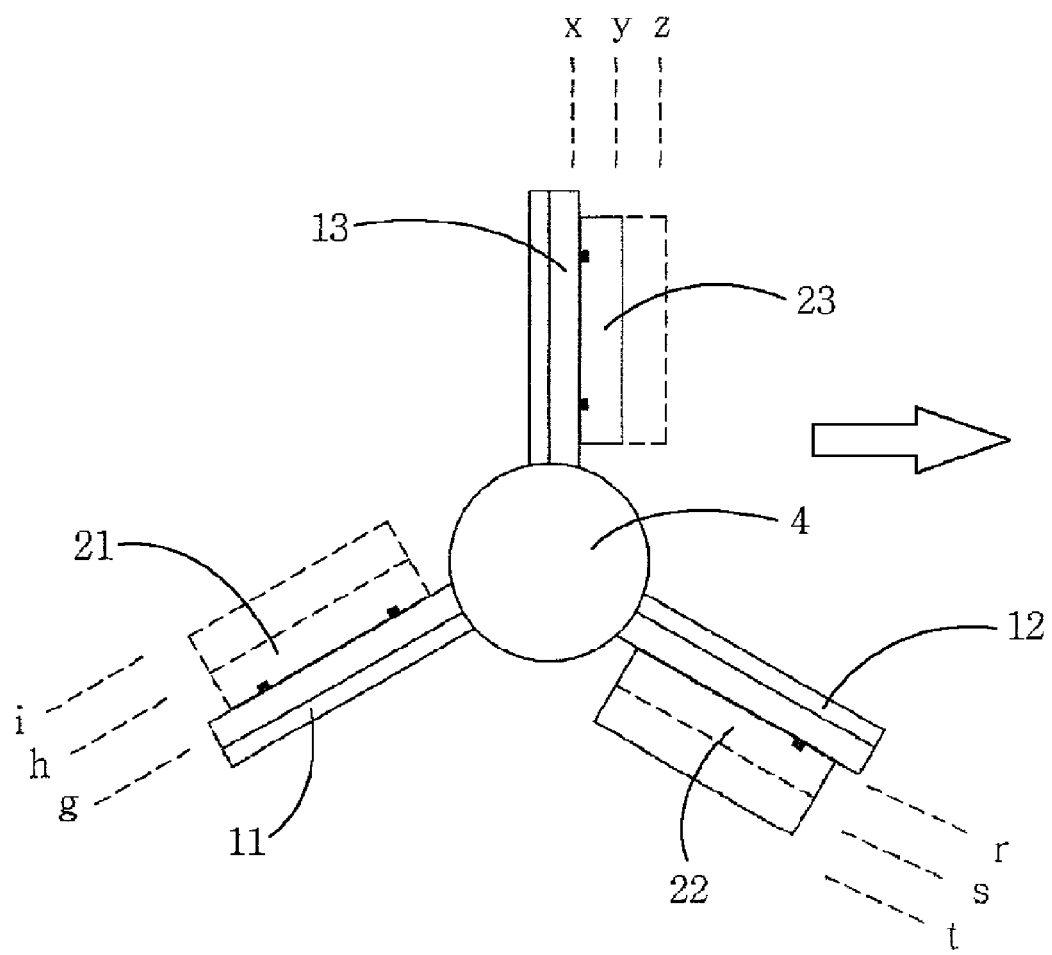

[Fig. 7]
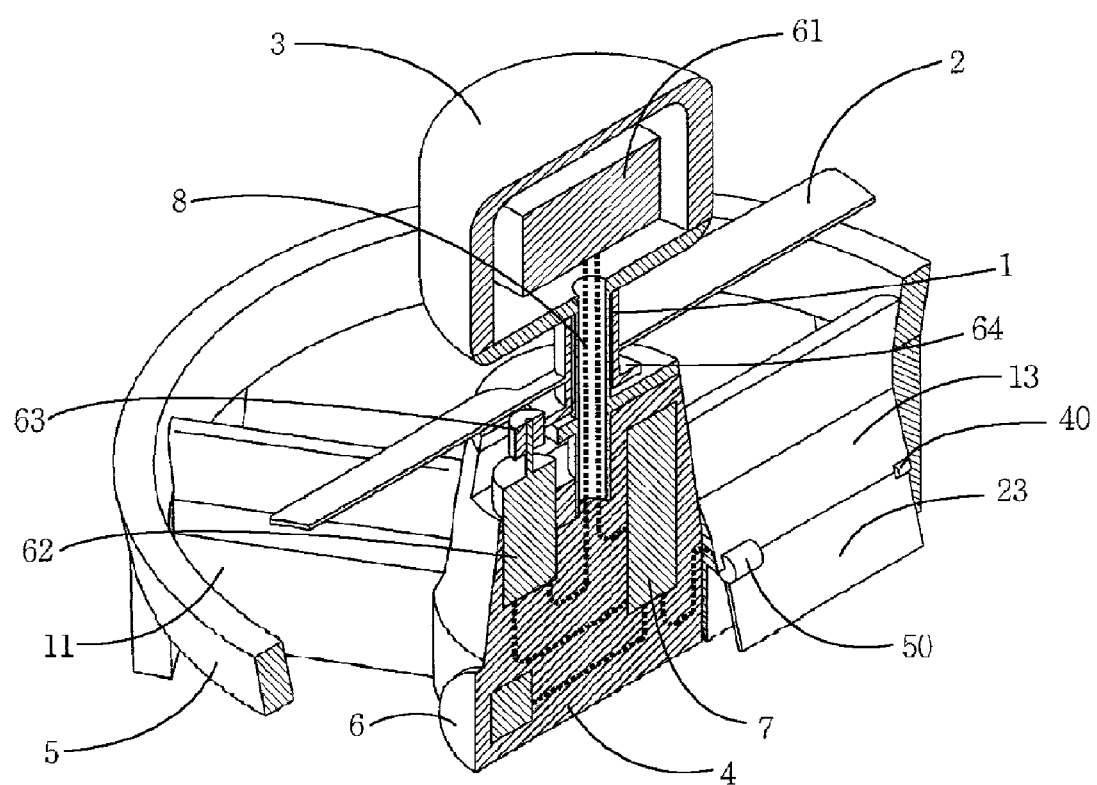

BOTTOM BLADE TYPE TREFOIL FLIGHT VEHICLE

TECHNICAL FIELD

The present invention relates to a bottom blade type flight vehicle, which is a kind of unmanned rotational blade type flight vehicles.

BACKGROUND ART

In general, a bottom blade type flight vehicle includes a propeller and adjustment blades. The bottom blade type flight vehicle rotates the propeller using power and adjusts the adjustment blades for ascending, descending, forward and backward advancing, hovering, left and right rotation, and leftward and rightward advancing.

According to the related art, the bottom blade type flight vehicle includes a plurality of pairs of fixing plates as well as a plurality of pairs of forward and backward adjustment blades and a plurality of pairs of left and right rotation adjustment blades installed to lower portions of the fixing plates while being separated from each other at an angle of 90° to restrict the shake in the front and rear directions of the bottom blade type flight vehicle and the fluctuation in the left and right directions of the bottom blade type flight vehicle, so that the bottom blade type flight vehicle may have the complex structure and the complex adjustment.

The forward and backward adjustment blades and the left and right rotation adjustment blades are moved to the left and right about the vertical plane, respectively, so the distance between adjacent adjustment blades becomes narrowed sometimes. Thus, the flow of wind around the adjacent adjustment blades may become uneven because the wind generated from the adjacent adjustment blades is directed against each other, so that the bottom blade type flight vehicle is unstable and the power efficiency is degraded.

In addition, since long times ago, there has been increasingly required a bottom blade type flight vehicle having a small size with superior power efficiency and long duration of flight to perform the scouting and surveillance in a narrow space as well as an outdoor area.

DISCLOSURE

Technical Problem

The present invention has been made to solve the problems occurring in the related art, in which plural pairs of fixing plates, forward and backward adjustment blades and left and right rotation adjustment blades are separately mounted, and an object of the present invention is to provide a bottom blade type trefoil flight vehicle, in which three pairs of fixing plates and three pairs of adjustment blades are integrally formed while being separated at an angle of 120°, so that adjacent fixing plates are more spaced apart from each other than the adjacent fixing plates of the related art which are separated from each other at an angle of 90°, thereby allowing the flow of wind to be uniform around the adjustment blades and adjusting the flight of the bottom blade type trefoil flight vehicle by combining the adjustment blades.

In addition, a middle portion of each fixing plate protrudes while being inclined with respect to the vertical plane to partially remove anti-torque, a bottom portion of each fixing plate is formed with a flat recess so that the adjustment blade having a rectangular plate shape is installed in the flat recess, and a rear surface of each fixing plate has a streamline shape to protect the adjustment blade and to enable the uniform flow of wind.

Therefore, the present invention provides a bottom blade type trefoil flight vehicle having a novel structure of the fixing plates and the adjustment blades to simplify the structure of the bottom blade type trefoil flight vehicle. According to the present invention, the bottom blade type trefoil flight vehicle can improve the power efficiency and lengthen the duration of flight. In addition, the weight and the volume of the bottom blade type trefoil flight vehicle can be reduced, so that the bottom blade type trefoil flight vehicle can be manufactured in a small size. Thus, the bottom blade type trefoil flight vehicle can perform the ascending, descending, forward and backward advancing, hovering, left and right rotation, and leftward and rightward advancing in a narrow space as well as an outdoor area.

Technical Solution

In order to accomplish the above objects, according to one embodiment of the present invention, there is provided a bottom blade type trefoil flight vehicle including a fixed pitch propeller horizontally mounted about a central shaft, a power unit installed at an upper portion of the central shaft of the propeller, and a control unit installed at a lower portion of the central shaft of the propeller. Three pairs of fixing plates, including adjustment blades, a circular frame and leg plates are installed at a lower portion of the central shaft of the propeller.

First to third fixing plates are sequentially mounted about the control unit at an angle of 120°, one ends of the first to third fixing plates are mounted to the control unit, opposite ends of the first to third fixing plates are mounted to the circular frame and the leg plates, and the leg plates are longitudinally fixed to a lower portion of the circular frame.

An upper portion of a front surface of each fixing plate is perpendicularly flat, a middle portion of each fixing plate protrudes while being inclined with respect to a vertical plane to partially remove anti-torque, a bottom portion of each fixing plate is formed with a flat recess so that the adjustment blade having a rectangular plate shape is installed in the flat recess, and a rear surface of each fixing plate has a streamline shape to enable a uniform flow of wind. First to third adjustment blades are independently adjusted by the adjustment devices connected to the control device of the control unit.

The control unit is connected to the fixing plate, the circular frame, and the leg plate, so that an additional support is not necessary.

Advantageous Effects

Adjacent adjustment blades are arranged at an angle of 120°, other than 90°, so that the distance between the adjacent adjustment blades is widened. The hinge is installed at a lower portion of the fixing plate such that the adjustment blade can be moved only in the left direction about the vertical plane to protect the adjustment blade. In addition, the uneven flow of wind caused by the adjustment blades, which are arranged closely to each other, can be prevented.

DESCRIPTION OF DRAWINGS

FIG. 1 is a perspective view showing a bottom blade type trefoil flight vehicle according to the present invention;

FIG. 2 is a partially-cut perspective view of FIG. 1 in which a fixing plate is partially cut;

FIG. 3 is a plan view showing the state of blades upon the forward advancing of a bottom blade type trefoil flight vehicle;

FIG. 4 is a plan view showing the state of blades upon the backward advancing of a bottom blade type trefoil flight vehicle;

FIG. 5 is a plan view showing the state of blades upon the leftward advancing of a bottom blade type trefoil flight vehicle;

FIG. 6 is a plan view showing the state of blades upon the rightward advancing of a bottom blade type trefoil flight vehicle; and FIG. 7 is a partially-cut sectional view showing elements of a bottom blade type trefoil flight vehicle according to the embodiment of the present invention.

BEST MODE

Mode for Invention

Hereinafter, a bottom blade type trefoil flight vehicle according to the exemplary embodiment of the present invention will be described with reference to accompanying drawings.

According to the present invention, a fixed pitch propeller 2 is horizontally mounted about a central shaft 1, a power unit 3 is provided at an upper portion of the central shaft 1, and a control unit 4 is provided at a lower portion of the central shaft 1. First to third fixing plates 11 to 13 are arranged at an angle of 120° in such a manner that one ends of the first to third fixing plates 11 to 13 are longitudinally fixed to the control unit 4 and the other ends of the first to third fixing plates 11 to 13 are longitudinally fixed to a circular frame 5 and leg plats 31, 32 and 33. First to third adjustment blades 21 to 23, which are adjusted by an adjustment device 50 under the control of the control device of the control unit 4, are installed at lower portions of front surfaces of the first to third fixing plates 11 to 13.

The circular frame 5 serves as a path for transferring wind in the downward direction as the wind is generated through the rotation of the propeller 2, and the first to third fixing plates 11 to 13 and the leg plates 31 to 33 are fixedly attached to the circular frame 5.

As shown in FIG. 7, the central shaft 1 has a hollow cylindrical pipe shape and is fixed to the power unit 3 and the control unit 4. A connection wire 8 extends through the inside of the central shaft 1 to connect the power unit 3 to the control unit 4. In addition, the propeller 2, which is rotated counterclockwise by the power unit 3, is fixed to an outer portion of the central shaft 1.

The leg plates 31 to 33 protect the adjustment blades 21 to 23 and the fixing plates 11 to 13 upon the take-off or the landing of the flight vehicle. The leg plates 31 to 33 are fixed to the lower portion of the circular frame 5 such that the flow of wind directed downward due to the rotation of the propeller 2 can be easily transferred to the adjustment blades 21 to 23 and the fixing plates 11 to 13.

In addition, since the fixing plates 11 to 13 are fixedly attached to the control unit 4, the circular frame 5 and the leg plates 31 to 33, the fixing plates 11 to 13 may serve as a support for the flight vehicle, so that an additional support is not necessary.

According to the present invention, the weight of the flight vehicle is distributed in upward and downward directions about the central shaft 1 of the fixed pitch propeller 2. In detail, the weight of the flight vehicle is distributed in the upward and downward directions in such a manner that the center of gravity of the flight vehicle is placed on a point where the central shaft meets the propeller, so that the stable equilibrium of the flight vehicle can be easily achieved due to the restoring force of the flight vehicle.

FIG. 2 is a perspective view showing the structure of the first to third fixing plates 11 to 13 and the first to third adjustment blades 21 to 23. The circular frame 5 and the leg plates 31 to 33 are omitted in FIG. 2 for the purpose of clear explanation. Referring to FIG. 2, the first to third fixing plates 11 to 13, to which the first to third adjustment blades 21 to 23 are attached, are arranged while being separated from each other at an angle 120°. One ends of the first to third fixing plates 11 to 13 are longitudinally fixed to the control unit 4.

A part of the first fixing plate 11 is illustrated in a dotted line in FIG. 2 to show a part of the first adjustment blade 21.

As shown in FIG. 2, the first to third adjustment blades 21 to 23 are mounted at lower portions of front surfaces of the first to third fixing plates 11 to 13. A bottom portion of each fixing plate is formed with a flat recess so that the adjustment blade having a rectangular plate shape is installed in the flat recess in such a manner that the adjustment blade can be moved by the adjustment device 50. That is, the first to third adjustment blades 21 to 23 are fixed to the first to third fixing plates 11 to 13 by the adjustment devices 50 and the hinges 40, respectively.

The first to third adjustment blades 21 to 23 are mounted to the lower portions of the front surfaces of the first to third fixing plates 11 to 13 in such a manner that the first to third adjustment blades 21 to 23 can be independently adjusted within the range of 45° in the left direction by the adjustment devices 50. In addition, a transverse width of each adjustment blade is slightly shorter than a distance between the control unit and the leg plate, so that the adjustment blade can be prevented from making contact with the control unit and the leg plate when the adjustment blade is moved.

In addition, the front surface of each fixing plate is divided into an upper portion, a middle portion and a lower portion. As shown in FIG. 2, the upper portion of the fixing plate 12 is a vertical plane to allow the wind to be directed downward without being subject to resistance, and the middle portion of the fixing plate 12 protrudes forward while being inclined such that the wind directed downward due to the rotation of the propeller can make contact with the middle portion of the fixing plate 12 to partially remove anti-torque of the flight vehicle. The fixing plate is formed at the bottom surface thereof with the flat recess and the adjustment blade is installed in the flat recess by the hinge in such a manner that the adjustment blade can be moved by the adjustment device 50. In addition, the rear surface of each fixing plate has a streamline shape to enable a uniform flow of wind and to protect the adjustment blades.

In general, the area ratio of the middle portion of the fixing plate to the adjustment blade is 2:1 or 5:1, preferably, 1:1 or 4:1.

Hereinafter, the flight scheme of the flight vehicle will be described with reference to accompanying drawings.

First, the hovering and left and right rotation advancing of the flight vehicle will be described with reference to FIGS. 1 to 3. As the propeller 2 is rotated counterclockwise by the power of the power unit 3, the flight vehicle is rotated clockwise due to the anti-torque caused by the rotation of the propeller.

At this time, in order to remove the anti-torque caused by the rotation of the propeller while preventing the flight vehicle from rotating, as shown in FIG. 2, the first adjustment blade 21 is placed in a position h, the second adjustment blade 22 is placed in a position s and the third adjustment blade 23 is placed in a position y such that the gradient of the middle portion of each fixing plate is equal to the gradient of each adjustment blade about the vertical plane. In this case, the wind directed downward due to the rotation of the propeller 2 is applied to the inclined surface of each fixing plate and the first to third adjustment blades 21 to 23, so that the anti-torque of the flight vehicle is offset. Thus, the flight vehicle is kept in the hovering state without rotating.

Similarly to the above, if the first adjustment blade 21 is placed in a position i, the second adjustment blade 22 is placed in a position t and the third adjustment blade 23 is placed in a position z to widen the angle of the adjustment blade, the wind directed downward due to the rotation of the propeller 2 is applied to the inclined surface of each fixing plate and the first to third adjustment blades 21 to 23, so that the force greater than the anti-torque of the flight vehicle is generated. Thus, the flight vehicle rotates counterclockwise, so that the flight vehicle performs the left rotation in a fast speed.

In contrast, if the first adjustment blade 21 is placed in a position g, the second adjustment blade 22 is placed in a position r and the third adjustment blade 23 is placed in a position x to reduce the angle of the adjustment blade, the wind directed downward due to the rotation of the propeller 2 is applied to the inclined surface of each fixing plate and the first to third adjustment blades 21 to 23 with a force smaller than the anti-torque of the flight vehicle. Thus, the flight vehicle rotates clockwise, so that the flight vehicle performs the right rotation in a fast speed.

The speed of the left rotation and the right rotation of the flight vehicle can be variously adjusted by controlling the angle of the adjustment blade.

FIGS. 3 to 6 show the forward advancing, backward advancing, leftward advancing and the rightward advancing of the flight vehicle under the same position of the adjustment blades 21 to 23. FIGS. 3 to 6 are plan views in which the propeller, the power unit, the circular frame and the leg plates of FIG. 1 are omitted to simply illustrate the control unit, the fixing plates, and the adjustment blades.

Hereinafter, the forward advancing, the backward advancing, the leftward advancing and the rightward advancing of the flight vehicle will be described with reference to FIGS. 3 to 6. The forward advancing, the backward advancing, the leftward advancing and the rightward advancing of the flight vehicle can be adjusted by adjusting the angle of the first to third adjustment blades 21 to 23. For the purpose of convenience, if the flight vehicle moves downward as shown in FIG. 3, it is defined as the forward advancing, if the flight vehicle moves upward as shown in FIG. 4, it is defined as the backward advancing, if the flight vehicle moves leftward as shown in FIG. 5, it is defined as the leftward advancing, and if the flight vehicle moves rightward as shown in FIG. 6, it is defined as the rightward advancing.

In order to allow the flight vehicle to move downward as shown in FIG. 3, the first adjustment blade 21 is placed in the position i, the second adjustment blade 22 is placed in the position t, and the third adjustment blade 23 is placed in the position x. In this case, the angle of the first and second adjustment blades 21 and 22 is widened, so a great amount of wind directed downward due to the rotation of the propeller is applied to the first and second adjustment blades 21 and 22. In addition, since the third adjustment blade 23 is vertically arranged, the third adjustment blade 23 is not subject to the wind. Thus, the flight vehicle is inclined as indicated by the arrow, so that the flight vehicle performs the forward advancing.

In addition, in order to allow the flight vehicle to move upward as shown in FIG. 4, the first adjustment blade 21 is placed in the position g, the second adjustment blade 22 is placed in the position r, and the third adjustment blade 23 is placed in the position z. In this case, the first and second adjustment blades 21 and 22 are vertically arranged, so the first and second adjustment blades 21 and 22 are not subject to the wind. In addition, the angle of the third adjustment blade 23 is widened, so a great amount of wind is applied to the third adjustment blade 23. Thus, the flight vehicle is inclined as indicated by the arrow, so that the flight vehicle performs the backward advancing.

Further, in order to allow the flight vehicle to move leftward as shown in FIG. 5, the first adjustment blade 21 is placed in the position i, the second adjustment blade 22 is placed in the position r, and the third adjustment blade 23 is placed in the position y. In this case, a great amount of wind directed downward due to the rotation of the propeller is applied to the first adjustment blade 21. In addition, the second adjustment blade 22 is vertically arranged, so the second adjustment blade 22 is not subject to the wind and the third adjustment blade 23 is inclined at the gradient identical to the gradient of the lower portion of the fixing plate. Thus, the third adjustment blade 23 may be subject to the wind of intermediate level. Therefore, the flight vehicle is inclined as indicated by the arrow, so that the flight vehicle performs the leftward advancing.

In addition, in order to allow the flight vehicle to move rightward as shown in FIG. 6, the first adjustment blade 21 is placed in the position g, the second adjustment blade 22 is placed in the position t, and the third adjustment blade 23 is placed in the position y. In this case, the flight vehicle is inclined as indicated by the arrow, so that the flight vehicle performs the rightward advancing.

As described above, the hovering, the left rotation, the right rotation, the forward advancing, the backward advancing, the leftward advancing and the rightward advancing of the flight vehicle can be adjusted by independently adjusting the angle of the first to third adjustment blades 21 to 23. In other words, the speed of the flight vehicle can be changed by adjusting the angle of each adjustment blade.

According to the present invention, three pairs of fixing plates including the adjustment blades are arranged while being separated from each other at an angle of 120°, so the affect of the wind can be reduced between adjacent adjustment blades. Thus, the structure of the flight vehicle can be simplified and the operation of the flight vehicle can be easily adjusted. Thus, the bottom blade type trefoil flight vehicle can improve the power efficiency and lengthen the duration of flight. In addition, the weight and the volume of the bottom blade type trefoil flight vehicle can be reduced.

In addition, the flight vehicle can be manufactured in a small size, so the flight vehicle can be used in a narrow space and an indoor area. Further, the flight vehicle can perform the hovering, left and right rotation, and leftward and rightward advancing by using three adjustment blades.

FIG. 7 is a sectional view of the flight vehicle, in which a camera 6 is installed in the control unit 4. The power unit 3 having a power source 61 is disposed on an upper portion of the central shaft 1 of the propeller 2. In addition, an external gear 64, a power device 62, a power gear 63, the control unit 4 equipped with a control device 7 and the camera 6, the adjustment blades 21 to 23, the fixing plates 11 to 13, and the leg plates 31 to 33 are provided at the lower portion of the central shaft 1 of the fixed pitch propeller 2 in such a manner that the center of the gravity of the flight vehicle can be located in the vicinity of the central shaft 1 of the fixed pitch propeller 2 and the weight of the flight vehicle can be distributed in the upward and downward directions.

Hereinafter, the operation of the present invention will be described with reference to FIG. 7. The control device receiving the power through the connection wire 8 controls the power device 62 and the power gear 63 fixed to a shaft of the power device 62 is rotated. Thus, the external gear 64 engaged with the power gear 63 is also rotated, so that the fixed pitch propeller 2 is rotated. Accordingly, the flight vehicle performs the ascending or descending under the control of the adjustment blades.

The power of the power unit 3 is transferred to the control unit 4 through the connection wire 8 extending through the central shaft 1 prepared as a hollow pipe.

In addition, positions of the power unit 3 and the control unit 4 may be interchanged by taking the balance of the weight and the design rule into consideration such that the center of gravity of the flight vehicle can be located at a contact portion between the propeller 2 and the central shaft 1. In addition, the position of the camera 6 can be changed. For instance, the camera 6 can be installed below the controller 4 or above the power unit 3 to facilitate the scouting and surveillance.

In addition, a position recognition device can be installed in the flight vehicle to recognize the position and the flight direction of the flight vehicle. Further, a flickering lamp can be installed in front of the fixing plate such that the position of the fixing plate can be recognized during the flight operation of the flight vehicle.

INDUSTRIAL APPLICABILITY

As described above, according to the present invention, a complex structure of the fixing plates and the adjustment blades is not necessary for the flight operation of the flight vehicle. Three pairs of fixing plates including the adjustment blades are arranged while being separated from each other at an angle of 120°, so the ascending, the descending, the left and right rotation, the hovering, forward and backward advancing, and leftward and rightward advancing of the flight vehicle can be performed by adjusting the adjustment blades. In addition, the structure of the flight vehicle can be simplified and the operation of the flight vehicle can be easily adjusted. Further, the flight vehicle can improve the power efficiency and lengthen the duration of flight. Since the three pairs of the fixing plates and the adjustment blades are arranged while being separated from each other at an angle of 120°, the bad affect of wind between the adjacent adjustment blades can be reduced.

In addition, the structure of the flight vehicle can be simplified and the flight operation of the flight vehicle can be easily adjusted, so that the flight vehicle can be manufactured in a small size with light weight. Thus, the flight vehicle can be used in a narrow space and an indoor area. Further, the flight vehicle is equipped with an inspection device to facilitate the scouting and surveillance.

The invention claimed is:

1. A bottom blade type trefoil flight vehicle comprising:
    a fixed pitch propeller horizontally mounted about a central shaft;
    a power unit installed at an upper portion of the central shaft of the propeller; and
    a control unit installed at a lower portion of the central shaft of the propeller,
    wherein the control unit includes a control device, first to third fixing plates are sequentially mounted about the control unit at an angle of 120°, one ends of the first to third fixing plates are mounted to the control unit, opposite ends of the first to third fixing plates are mounted to a circular frame and leg plates, the leg plates are longitudinally fixed to a lower portion of the circular frame, first to third adjustment blades are installed at lower portions of front surfaces of the first to third fixing plates by adjustment devices and hinges, respectively, and the first to third adjustment blades are adjusted by the adjustment devices connected to the control device.

2. The bottom blade type trefoil flight vehicle of claim 1, wherein anti-torque, ascending, descending, hovering, backward advancing, left and right rotation, and leftward and rightward advancing of the bottom blade type trefoil flight vehicle performed by adjusting the fixed pitch propeller and the first to third adjustment blades.

3. The bottom blade type trefoil flight vehicle of claim 1, wherein an upper portion of a front surface of each fixing plate is perpendicularly flat, a middle portion of each fixing plate protrudes while being inclined with respect to a vertical plane to partially remove anti-torque, a bottom portion of each fixing plate is formed with a flat recess so that the adjustment blade having a rectangular plate shape is installed in the flat recess, and a rear surface of each fixing plate has a streamline shape to enable a uniform flow of wind.

* * * * *